(12) United States Patent
Lee et al.

(10) Patent No.: US 8,422,211 B2
(45) Date of Patent: Apr. 16, 2013

(54) ASSEMBLING/DISASSEMBLING KEYBOARD STRUCTURE FOR A PORTABLE DEVICE

(75) Inventors: Hsiao-hui Lee, Taipei (TW);
Kuang-liang Chen, Taipei (TW);
Ping-yang Fan, Taipei (TW)

(73) Assignee: Elitegroup Computer Systems Co., Ltd., Taipei (TW)

( * ) Notice: Subject to any disclaimer, the term of this patent is extended or adjusted under 35 U.S.C. 154(b) by 300 days.

(21) Appl. No.: 12/885,090

(22) Filed: Sep. 17, 2010

(65) Prior Publication Data

US 2012/0039033 A1    Feb. 16, 2012

(30) Foreign Application Priority Data

Aug. 12, 2010   (TW) .............................. 99215500 U

(51) Int. Cl.
*H05K 7/14*   (2006.01)

(52) U.S. Cl.
USPC .................. 361/679.17; 361/679.08; 248/917

(58) Field of Classification Search ............. 361/679.01, 361/679.02, 679.08, 679.09, 679.21, 679.26, 361/679.27, 679.17; 248/917–924
See application file for complete search history.

(56) References Cited

U.S. PATENT DOCUMENTS

| 5,966,284 A * | 10/1999 | Youn et al. ............... 361/679.17 |
| 6,320,743 B1 * | 11/2001 | Jin et al. .................... 361/679.08 |
| 6,672,796 B2 * | 1/2004 | Chiang et al. ................. 403/327 |
| 2004/0057195 A1 * | 3/2004 | Hsieh ............................. 361/680 |
| 2007/0133160 A1 * | 6/2007 | Ma ................................. 361/683 |

* cited by examiner

*Primary Examiner* — Jinhee Lee
*Assistant Examiner* — Ingrid Wright
(74) *Attorney, Agent, or Firm* — Cheng-Ju Chiang

(57) ABSTRACT

An assembling/disassembling keyboard structure for a portable device includes a main body, a keyboard, and at least one fastening unit. The main body has a surface which forms a containing cavity with at least one side wall and a plurality of holes defined on the side wall. The keyboard is capable of being assembled to/disassembled from the containing cavity. The fastening unit is disposed on the other surface in opposite to the surface where the containing cavity was formed and has at least one engaging portion which can be correspondingly inserted into one of the holes for assembling/disassembling the keyboard to/from the containing cavity. Accordingly, the present invention is not only capable of easily assembling/disassembling the keyboard by the engaging portion but also prevents the keyboard from being possibly scratched or damaged during a process of utilizing an auxiliary tool to assembling/disassembling the keyboard.

6 Claims, 5 Drawing Sheets

ASSEMBLING/DISASSEMBLING KEYBOARD STRUCTURE FOR A PORTABLE DEVICE

TECHNICAL FIELD OF THE INVENTION

The present invention relates to a structure applied for a portable device, and more particularly, to a portable device having a structure capable of easily assembling/disassembling a keyboard to/from the portable device.

BACKGROUND OF THE INVENTION

Please refer to FIG. 1, which illustrates a conventional notebook computer 1. The notebook computer 1 comprises a main body 10 and a keyboard 20. The main body 10 has a containing cavity 12 for accommodating the keyboard 20 therein. A first side wall 16 formed on the containing cavity 12 has a plurality of elastic fastening structures 14 protruded from the first side wall 16. When the keyboard 20 is placed in the containing cavity 12, the fastening structures 14 engage a first side 22 of the keyboard 20 so that the keyboard 20 can be fixed in the containing cavity 12. In another aspect, an auxiliary tool is essential for disassembling the keyboard 20 from the containing cavity 12. For example, a plastic workpiece is utilized to be inserted between the keyboard 20 and the fastening structures 14 to disassemble the keyboard 20 from the containing cavity 12. That is, the elastic auxiliary tool makes the fastening structures 14 being deformed elastically toward a direction inside the first side wall 16 so that the keyboard 20 can be disassembled.

However, the above-mentioned process of disassembling the keyboard 20 from the containing cavity 12 invokes the following disadvantages. Firstly, the main body 10 and/or keyboard 20 is possibly scratched or damaged during the process of inserting the auxiliary tool between the keyboard 20 and the fastening structures 14. Secondly, such a keyboard 20 needs disassembled by manual with the auxiliary tool. For a notebook computer 1 that is sized larger and larger, disposals of more and more fastening structures 14 are required so that the time for utilizing auxiliary tool will be spent more.

Therefore, to solve the above-mentioned problems, there is a need for providing an easy assembling/disassembling keyboard structure for a user.

SUMMARY OF THE INVENTION

To solve the drawbacks of the above-mentioned prior art, a primary objective of the present invention is to provide an easy assembling/disassembling keyboard structure for a portable device.

To accomplish the invention objective, an assembling/disassembling keyboard structure for the portable device is provided according to the present invention and comprises a main body, a keyboard and at least one fastening unit. The main body has a surface which forms a containing cavity with at least one side wall and a plurality of holes defined on the at least one side wall. The keyboard is capable of being assembled to/disassembled from the containing cavity. The at least one fastening unit is disposed on the other surface in opposite to the surface where the containing cavity was formed. The at least one fastening unit has at least one engaging portion corresponding to one of the holes of the containing cavity for assembling/disassembling to/from the containing cavity.

The assembling/disassembling keyboard structure for the portable device is capable of easily assembling/disassembling to/from the keyboard from the portable device by the at least one engaging portion, so as to prevent the keyboard from being possibly scratched or damaged in a process of utilizing an auxiliary tool to assemble/disassemble the keyboard.

DETAILED DESCRIPTION OF THE INVENTION

Figure 1:
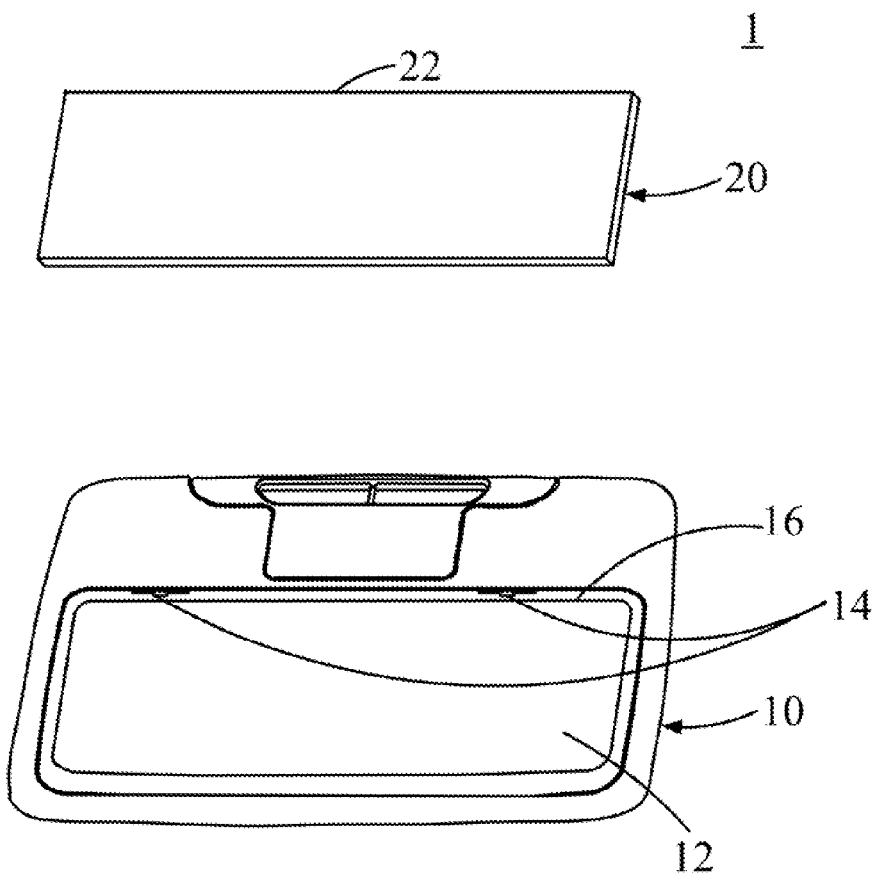
FIG. 1 illustrates a conventional notebook computer.
Figure 2:
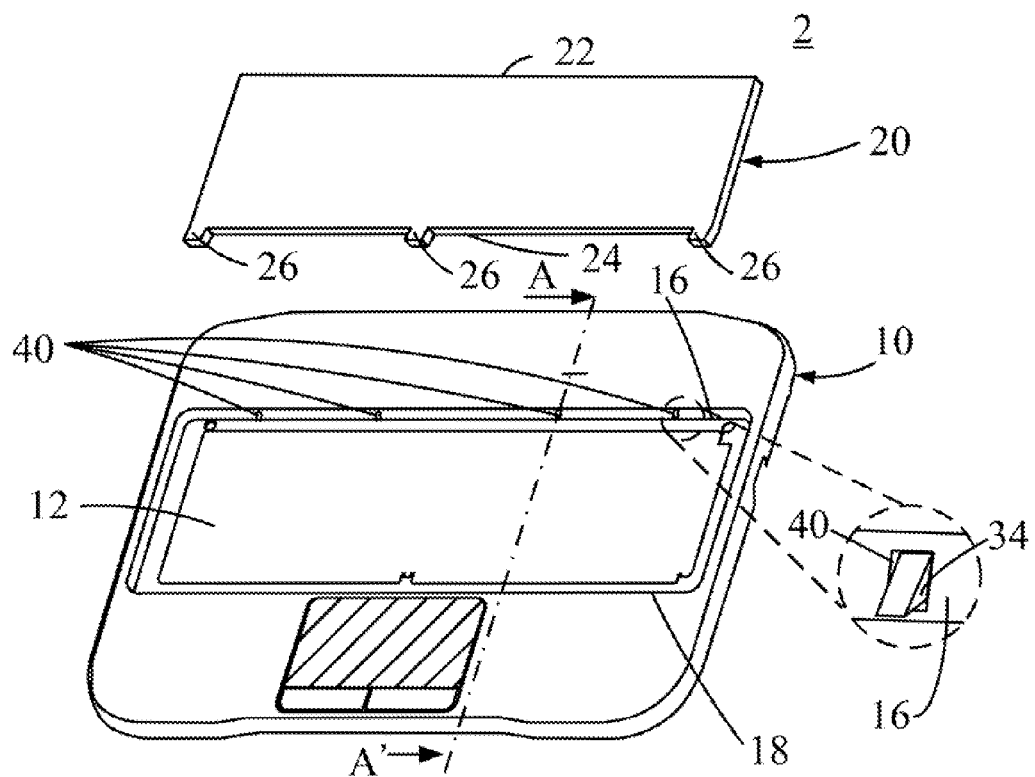
FIG. 2 illustrates a front view diagram of a portable device according to a first embodiment of the present invention.
Figure 3:
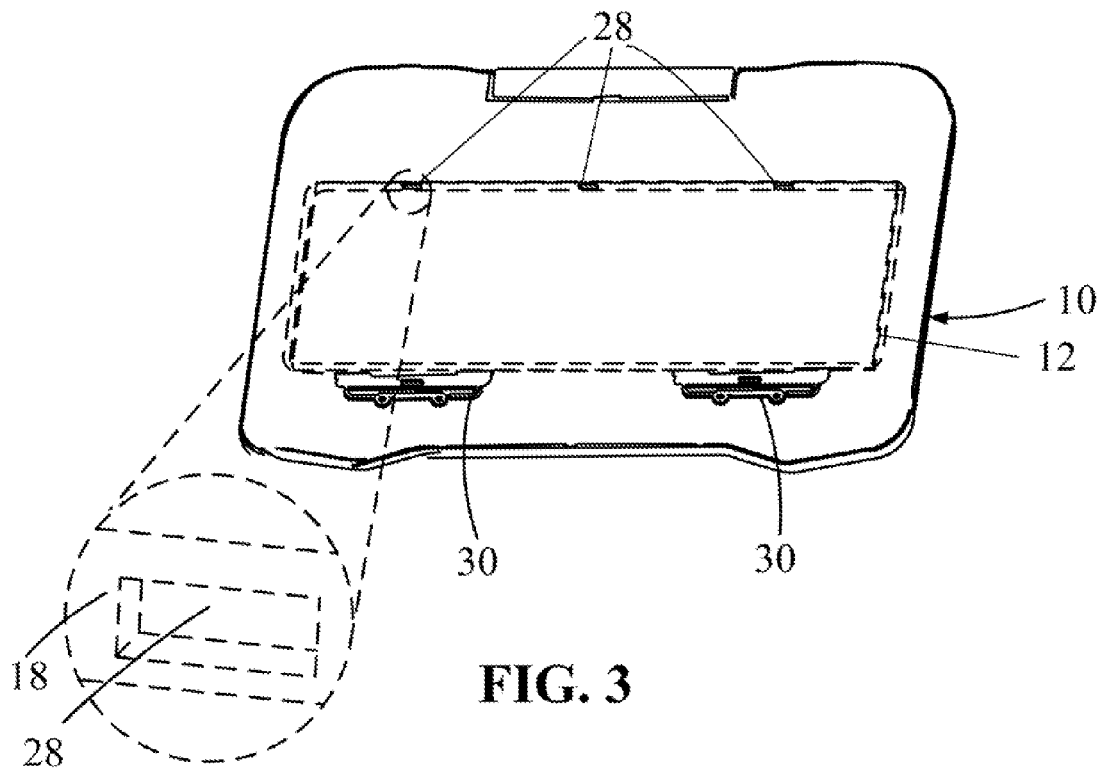
FIG. 3 illustrates a rear view diagram of the portable device as shown in FIG. 2.

Please refer to FIGS. 2-3, which respectively illustrate a front view diagram and a rear view diagram of a portable device 2 according to a first embodiment of the present invention. In the first embodiment, the portable device 2 comprises but is not limited to a notebook computer. The portable device 2 comprises but is not limited to a main body 10, a keyboard 20 for being assembled/disassembled, and at least one fastening unit 30.

As shown in FIG. 2, a containing cavity 12 is formed on a front surface of the main body 10. A first side wall 16 and a second side wall 18 are respectively formed on two laterals of the containing cavity 12. The keyboard 20 has a first side 22 and a second side 24, and is capable of being assembled/disassembled in/from the containing cavity 12. The second side has a plurality of protruded portions 26.

Please refer to FIG. 3, which illustrates two fastening units 30 disposed on the rear surface of the main body 10, correspondingly to the containing cavity 12 on the front surface of the main body 10. The two fastening units 30 are made of elastic material such as silicone. Further, the dotted lines shown in FIG. 3 represent a plurality of slots 28 being formed on the second side wall of the containing cavity 12 on the front surface of the body 10, wherein the slots 28 correspond to the protruded portions 26 (see FIG. 2) in the second side 24 of the keyboard 20.

Figure 4:
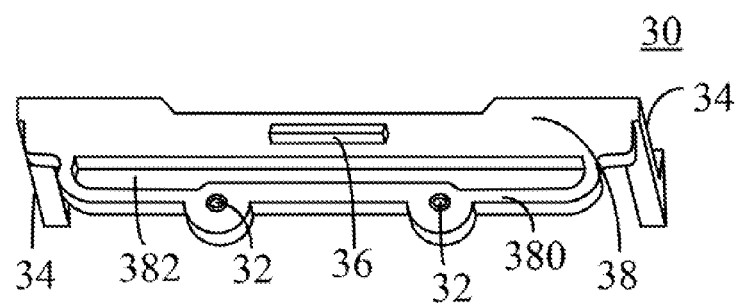
FIG. 4 illustrates a magnified stereographic diagram of the fastening unit as shown in FIG. 3.

Please further refer to FIG. 4, which illustrates a magnified stereographic diagram of the fastening unit 30 according to the first embodiment. The fastening unit 30 comprises a fastening body 38, two retaining portions 32, two engaging portions 34, a resilient arm 380, and a push button portion 36. The fastening body 38 can be an elongated structure. The push button portion 36 extends outwardly from a central position of a surface of the fastening body 38. The engaging portions 34 extend outwardly from two ends of the other surface in opposite to the surface of the push button portion 36 of the fastening body 38. An inclined structure is formed on a distal end of each engaging portion 34 and corresponds to the corresponding hole 40 shown in FIG. 2. The resilient arm 380 has two ends respectively connecting to one side of the fastening body 38 so as to form an opening 382 between the resilient arm 380 and the fastening body 38. The opening 388 provides a required movable space where the resilient arm 380 can be elastically deformed. The retaining portions 32 are disposed on the resilient arm 380 and may be structured in a semi-circle. The retaining portions 32 can be fixed on the rear surface of the main body 10 by various fixing methods, such as screws, posts, or glue. In another embodiment, each fastening unit 30 comprises one or more engaging portions 34 corresponding to the same number of hole 40 or holes 40.

Figure 5A:
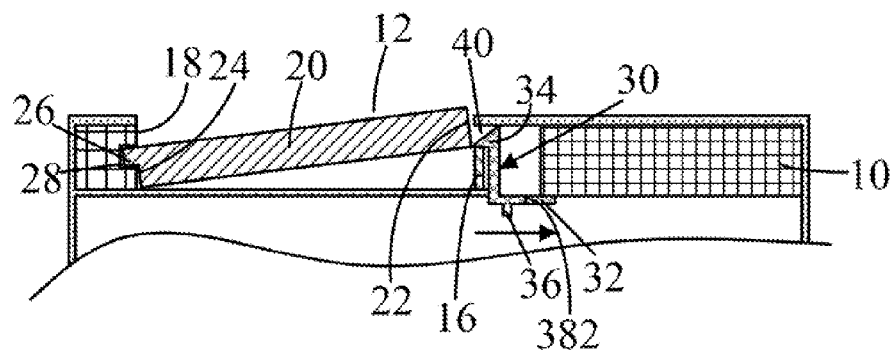
FIGS. 5A~5D respectively illustrate stepwise processes with cross-sectional diagrams along a cutting line A-A' shown in FIG. 2.

Please refer to FIGS. 5A~5D, which respectively illustrate stepwise processes with cross-sectional diagrams of the assembling/disassembling keyboard structure for the portable device according to the first embodiment of the present invention. Firstly as shown in FIG. 5A, when the keyboard 20 is intended to be assembled into the containing slot 12, the protruded portions 26 of the second side 24 obliquely engages the slots 28 of the second side wall 18. Then, the first side wall 22 of the keyboard 20 is pressed into the containing cavity 12 to contact the engaging portion 34 of the fastening unit 30 extending from the containing cavity 12. Since the fastening unit 30 is made of elastic material, the engaging portion 34 of the fastening portion 30 is pressed by the inserting action of the first side 22 of keyboard 20 so that the resilient arm 380 (see FIG. 4) of the fastening unit 30 is elastically deformed to lessen a space of the opening 382 to be smaller and therefore to move the engaging portion 34 toward the inside of the hole 40 of the first side wall 16 of the main body 10 along an arrow direction in FIG. 5A. Finally, the keyboard 20 is able to be placed flat in the containing cavity 12 of the main body 10.

Figure 5B:
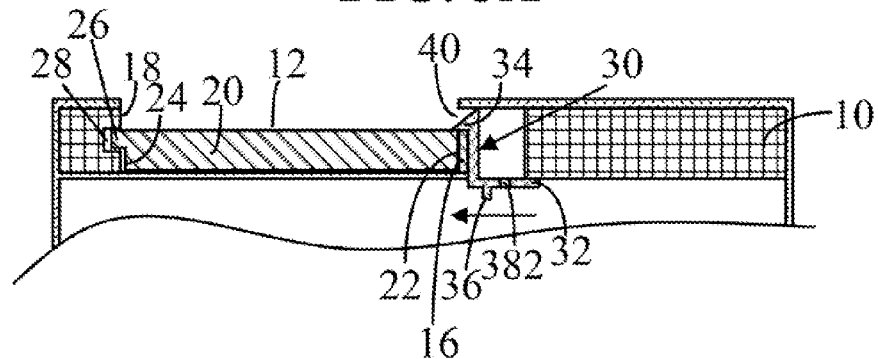

Further referring to FIG. 5B, when the keyboard 20 is fully accommodated within the containing cavity 12 of the main body 10, a force applied from the first side 22 of keyboard 20 to the engaging portion 34 of the fastening unit 30 is released to lead the resilient arm 380 springing back, freely. Then, the space of the opening becomes larger, and the engaging portion 34 is back to an original engaging position, along an arrow direction shown in FIG. 5B, where the engaging portion 34 is protruded outside the first side wall 16 of the containing cavity 12 so as to firmly fix the keyboard 20 in the containing cavity 12.

Figure 5C:
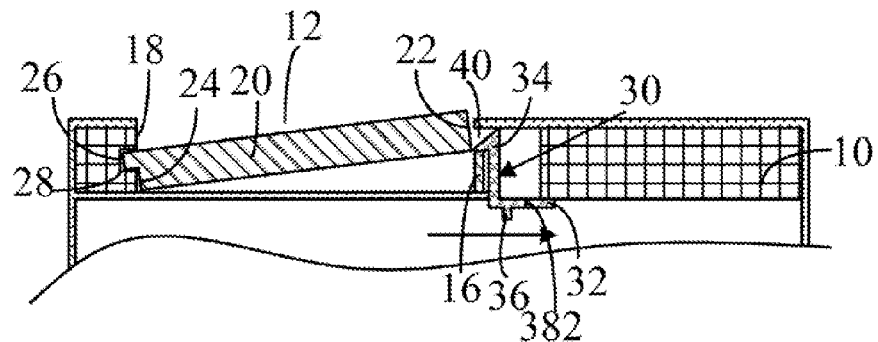

In contrast, as shown in FIG. 5C, when the keyboard 20 is intended to be disassembled from the containing cavity 12, an external force as a manual can be applied to the push button portion 36 of the fastening unit 30 along an arrow direction in FIG. 5C, so that the resilient arm 380 (see FIG. 4) of the fastening unit 30 is elastically deformed to lessen the space of the opening 328 to be smaller and to lead the entire engaging portion 34 also moving toward the inside of the hole 40. Accordingly, the keyboard 20 is released.

Figure 5D:
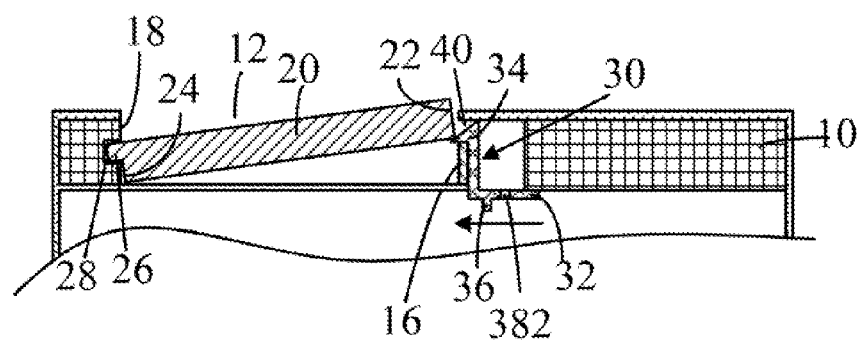

Further referring to FIG. 5D, when the force applied to the push button portion 36 is released, the resilient arm 380 provides a rebound force to move the engaging portion 34 toward the keyboard 20. Then, the engaging portion 34 is back to the original engaging position as shown in FIG. 5B. As a result, the inclined structure of the engaging portion 34 can raise the first side 22 of the keyboard 20 upwardly so that the keyboard 20 can be more easily disassembled form the containing cavity 12.

Figure 6:
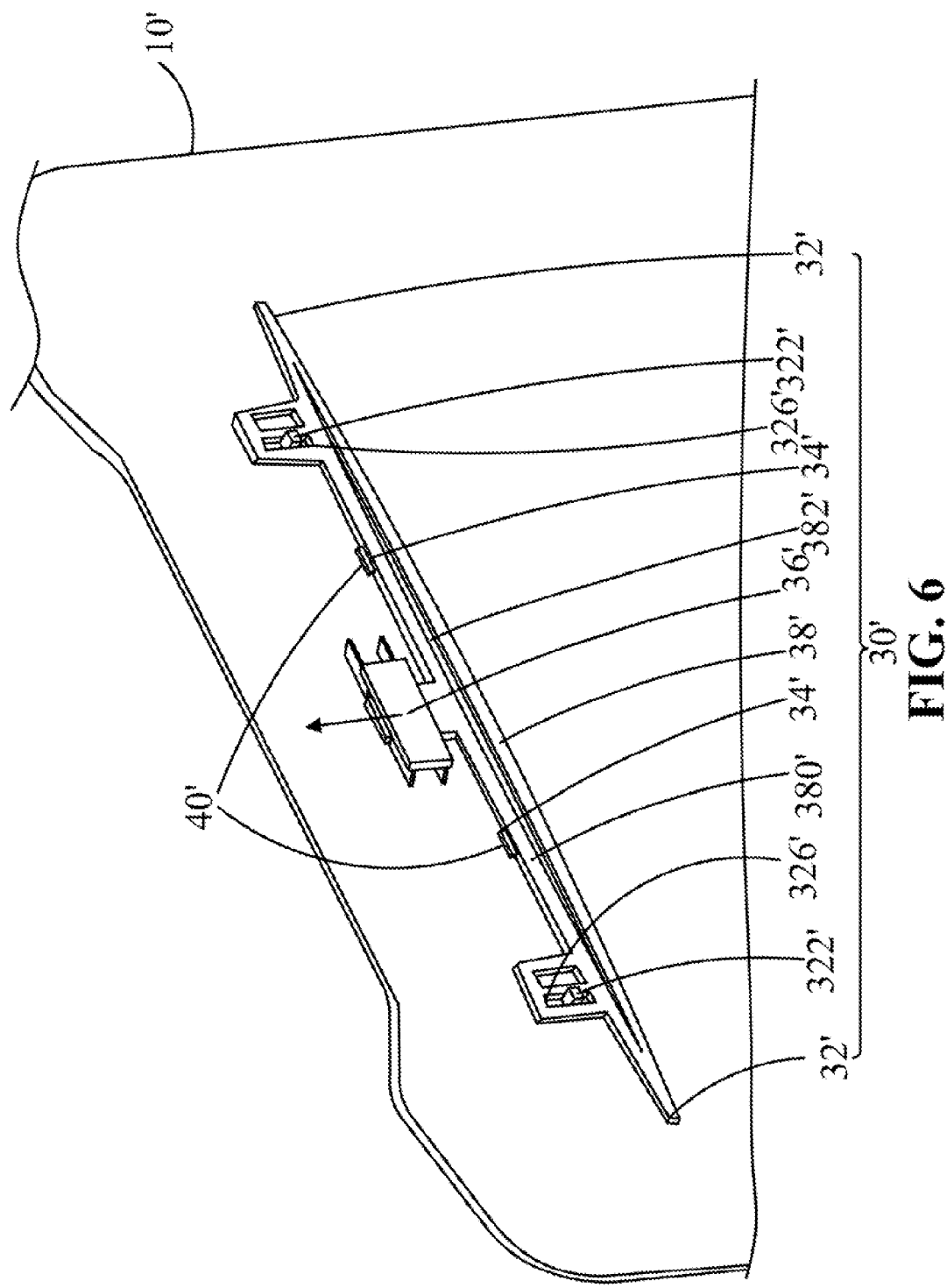
FIG. 6 illustrates a rear surface of a portable device according to a second embodiment of a structure for assembling/disassembling a keyboard to/from the portable device according to the present invention.

Please refer to FIG. 6, which illustrates a rear surface of a portable device such as a notebook computer 10' according to a second embodiment of the assembling/disassembling keyboard structure for the portable device of the present invention. A fastening unit 30' comprises a fastening body 38', two retaining portions 32', a resilient arm 380', a pair of guiding slot 326', two engaging portions 34', and a push button portion 36'. The differences between the first and second embodiments are described as followings. Firstly, the second embodiment utilizes only one fastening unit 30' instead of two fastening units 30 utilized in the first embodiment. However, since the only one fastening unit 30' is utilized herein, a preferred material of the fastening unit 30' is of metal so as to provide a strengthened force to engage the keyboard 20 (as shown in FIG. 2). Secondly, in the second embodiment, the push button portion 36' is disposed in a middle position of the resilient arm 380', differently from the manner that the push button portion 36 is disposed in the fastening body 38 in the first embodiment. As a result, when the keyboard 20 (as shown in FIG. 2) is intended to be disassembled from the main body 10', the push button portion 36' can be moved toward an arrow direction shown in FIG. 6 so as to lead the resilient arm 380' to move toward the arrow direction, thereby releasing the keyboard 20. On the other hand, the assembled processes of the keyboard 20 are the same as the first embodiment and omitted herein. Thirdly, a positioning portion 322' is disposed in each one of the guiding slot 326' to restrict the push button 36' moving within a proper range. Each positioning portion 322' is structured similar to T-shaped and also can restrict a movable range of the fastening unit 30'. Furthermore, in the second embodiment, the two engaging portions 34' are respectively disposed between the resilient arm 380' and each one of the guiding slots, and the two engaging portions 34' extend outwardly from a surface opposite the surface of the push button 36'. The engaging portions 34' will be inserted into the corresponding holes 40' of the main body 10'. An inclined structure is formed at a distal end of each engaging portion 34' and utilized as same principle as the first embodiment and therefore omitted herein. The resilient arm 380' has two ends respectively connecting to one side of the fastening body 38' so as to form an opening 382' between the fastening body 38' and the resilient arm 380'. The opening 382' is utilized for providing a movable range where the resilient arm 380' can be elastically deformed. In the second embodiment, the retaining portions 32' are disposed at two distal ends of the fastening body 38' and face the main body 10'. The retaining portions 32' may be fixed on the main body 10' by various fixing methods, such as screws, posts, or glue. In another embodiment, the retaining portions 32' can be positioned anywhere the resilient arm 380'. However, a restricted range of the guiding slots 326' should be rearranged if the retaining portions 32' are disposed at the resilient arm 380'. For example, the retaining portions 32' are disposed on two distal ends of the resilient arm 380' or beyond the movable range of the position portion 322'.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An assembling/disassembling keyboard structure for a portable device, comprising:
   a main body having a surface which forms a containing cavity with at least one side wall and a plurality of holes defined on the at least one side wall;
   a keyboard for being assembled to/disassembled from the containing cavity; and
   at least one fastening unit disposed on the other surface of the main body in opposite to the surface where the containing cavity was formed, having two engaging portions, each of which is inserted into corresponding one of the holes for assembling/disassembling the keyboard to/from the containing cavity;

wherein the fastening unit further comprises: a fastening body; a resilient arm connecting to the two engaging portions, each of which extends outwardly from the resilient arm and has an inclined structure for being inserted into the containing cavity via the corresponding hole, and the resilient arm having two ends respectively connecting to one side of the fastening body so as to form an opening between the resilient arm and the fastening body; two retaining portions disposed on the resilient arm, fixing the fastening unit on the other surface of the main body; and a push button portion disposed on the resilient arm and applied to assemble/disassemble the keyboard to/from the containing cavity; and wherein each of the retaining portions further comprises: a guiding slot formed on the resilient arm; and a positioning portion disposed within the guiding slot, restricting a movable range of the resilient arm.

2. The assembling/disassembling keyboard structure for the portable device claimed in claim 1, wherein the containing cavity has a first side wall for forming the plurality of holes.

3. The assembling/disassembling keyboard structure for the portable device claimed in claim 2, wherein the containing cavity further has a second side wall corresponding to the first side wall and having a plurality of slots.

4. The assembling/disassembling keyboard structure for the portable device claimed in claim 3, wherein the keyboard has a plurality of protruded portions for correspondingly embedding in the slots.

5. The assembling/disassembling keyboard structure for the portable device claimed in claim 1, wherein the fastening unit is made of elastic material.

6. The assembling/disassembling keyboard structure for the portable device claimed in claim 5, wherein the elastic material is metal.

* * * * *